United States Patent
Yahara et al.

(10) Patent No.: US 7,329,971 B2
(45) Date of Patent: Feb. 12, 2008

(54) VOICE COIL-TYPE LINEAR MOTOR WITH COOLING FUNCTION

(75) Inventors: Haruki Yahara, Fukuoka (JP); Makoto Matsumoto, Fukuoka (JP); Mitsuhiro Koga, Fukuoka (JP); Mitsuhiro Matsuzaki, Fukuoka (JP)

(73) Assignee: Kabushiki Kaisha Yasakawa Denki, Fukuoka (JP)

( * ) Notice: Subject to any disclaimer, the term of this patent is extended or adjusted under 35 U.S.C. 154(b) by 393 days.

(21) Appl. No.: 10/516,689

(22) PCT Filed: Jun. 5, 2003

(86) PCT No.: PCT/JP03/07165

§ 371 (c)(1),
(2), (4) Date: Dec. 6, 2004

(87) PCT Pub. No.: WO03/105323

PCT Pub. Date: Dec. 18, 2003

(65) Prior Publication Data

US 2005/0206246 A1    Sep. 22, 2005

(30) Foreign Application Priority Data

Jun. 6, 2002    (JP)    ............................. 2002-165864

(51) Int. Cl.
*H02K 41/00*    (2006.01)
(52) U.S. Cl. .......................................... 310/12; 310/52
(58) Field of Classification Search .................. 310/12, 310/52, 54, 58, 64
See application file for complete search history.

(56) References Cited

U.S. PATENT DOCUMENTS 6,323,567 B1 *   11/2001   Hazelton et al. .............. 310/12
(Continued)

FOREIGN PATENT DOCUMENTS

JP    54-97486 A    8/1979
(Continued)

*Primary Examiner*—Dang Le
*Assistant Examiner*—Nguyen N. Hanh
(74) *Attorney, Agent, or Firm*—Sughrue Mion, Pllc.

(57) ABSTRACT

A voice coil type linear motor with a cooling function. A closed magnetic circuit formed into the θ-shape, by an inner yoke provided between a pair of outer yokes made up of magnetic materials arranged in parallel with a longitudinal center axis in such a manner as to be in parallel with the pair of outer yokes. The outer yokes and side yokes are provided at both end portions of the inner yoke. Permanent magnets are provided on inner sides of the outer yokes and on outer sides of the inner yoke with polarities thereof which face opposite surfaces of the outer yoke. The inner yoke is made opposite to each other or with polarities thereof which face only the outer yokes being made opposite each other to thereby a field. An armature made up of a bobbin of non-magnetic and insulating materials is provided. A coil is provided around the bobbin between the permanent magnets via air gaps in such a manner as to move in an axial direction or in such a manner that. The coil is wound around the bobbin. A case is constructed on an exterior of the bobbin. A coil portion is made watertight. A fluid supply port and a fluid discharge port are provided on the bobbin or the case. A cooling fluid is caused to flow between the coil and the case so that the coil is cooled directly.

3 Claims, 4 Drawing Sheets

U.S. PATENT DOCUMENTS 6,856,049 B2 * 2/2005 Hirata .................. 310/12

FOREIGN PATENT DOCUMENTS

| | | | | |
|---|---|---|---|---|
| JP | 61085054 | A | * | 4/1986 |
| JP | 61247263 | A | * | 11/1986 |
| JP | 62114460 | A | * | 5/1987 |
| JP | 62173968 | A | * | 7/1987 |
| JP | 63148854 | A | * | 6/1988 |
| JP | 01097157 | A | * | 4/1989 |
| JP | 01126150 | A | * | 5/1989 |
| JP | 1-127379 | A | | 8/1989 |
| JP | 03023569 | A | * | 1/1991 |
| JP | 03052173 | A | * | 3/1991 |
| JP | 05122918 | A | * | 5/1993 |
| JP | 5-239557 | A | | 9/1993 |
| JP | 08098496 | A | * | 4/1996 |
| JP | 8-214530 | A | | 8/1996 |
| JP | 08214530 | A | * | 8/1996 |
| JP | 10112968 | A | * | 4/1998 |
| JP | 2000166211 | A | * | 6/2000 |
| JP | 2001-231246 | A | | 8/2001 |
| JP | 2001286118 | A | * | 10/2001 |
| JP | 2002-27724 | A | | 1/2002 |
| JP | 2002027724 | A | * | 1/2002 |
| JP | 2003333823 | A | * | 11/2003 |
| JP | 2004096952 | A | * | 3/2004 |

* cited by examiner

PRIOR ART

VOICE COIL-TYPE LINEAR MOTOR WITH COOLING FUNCTION

TECHNICAL FIELD

The present invention relates to a voice coil type linear motor, and more particularly to a cooling construction for voice coil type linear motors which are required to realize high thrust and high efficiency and to generate less heat.

BACKGROUND ART

Conventionally, there has existed a cooling construction for a voice coil type linear motor including a closed magnetic circuit formed into the θ-shape, by an inner yoke provided between a pair of outer yokes made up of magnetic materials arranged in parallel with a longitudinal center axis in such a manner as to be in parallel with the pair of outer yokes and side yokes provided at both end portions of the outer yokes and the inner yoke and permanent magnets provided on inner sides of the outer yokes and on outer sides of the inner yoke with polarities of the permanent magnets which face facing surfaces of the outer yoke and the inner yoke being made opposite, wherein an armature made up of a bobbin of non-magnetic and insulating materials and a coil provided around the bobbin is provided between the permanent magnets via air gaps in such a manner as to move in an axial direction, the cooling construction being characterized in that the bobbin is formed to have a cross section formed into the U-shape, whereby an interior of a cooler of a thin non-magnetic material is securely joined and fixed in place within a U-shaped groove and the coil is wound around an exterior of the cooler.

For example, according to JP-A-8-214530, a voice coil type linear motor such as shown in FIG. 5 is disclosed in order to provide a voice coil type linear motor which provides a good magnetic flux convergence, realizes a uniform magnetic flux flow through yokes, effects an effective operation of armature reaction over a whole stroke and saves space.

In FIG. 5, a field 50 is provided by a closed magnetic field formed into the θ-shape, by outer yokes 51, an inner yoke 52 and side yokes 53 and permanent magnets whose polarities are made opposite, and an armature 59 is provided via air gaps. The permanent magnets provided on the outer yokes 51 are made up of a plurality of permanent magnets 55a in which polarities of the adjacent permanent magnets are made opposite and which has the same width, the permanents magnets provided on the inner yoke 52 are made up of a plurality of permanent magnets 55b in which polarities of the adjacent permanent magnets are made opposite and which has the same width, and those of the permanent magnets which face each other are arranged in such a manner that the polarities thereof become different. Then, the coil is made up of a series coil 58a which divided at an equal pitch to that of the permanent magnets 55a and in which winding directions of the adjacent coils are made opposite, a thrust plate 58 having a flange 56 bent in a direction normal to the axial direction is fixed to sides and axial end portions of a bobbin 57, and work is connected to the flanges 56. Then, a cooler is provided in which a coolant is caused to flow through a magnetic gap between the inner yoke 52 and the bobbin 57 for cooling the coil.

In addition, a voice coil type linear motor is disclosed in JP-A-2002-27724 which has a cooling construction in which non-magnetic fluid cooled pipes which are formed into an integral unit by being bent in three dimensions or connected to each other in a watertight fashion are embedded in both surfaces which are defined between a coil and a cover on a non-magnetic gap side in such a manner as to extend from a fluid supply port to a fluid discharge port. According to the same unexamined patent publication, by provided a voice coil type linear motor having a construction such as shown in FIG. 6, a cooling function can be obtained which is free from a reduction in thrust and which can provide a high cooling performance and a high water tightness. In FIG. 6, a closed magnetic circuit is made up of an inner yoke 62, outer yokes 61 and side yokes 63, permanent magnets 65a, 65b are disposed on outer sides of the inner yoke 62 and inner sides of the outer yokes 61, and an armature 70 in which a coil 68 is wound around a bobbin is provided between the permanent magnets 65a, 65b via magnetic gaps. Then, a cover 69 which holds the armatures 70 and covers the respective yokes 61, 62, 63 and fluid cooled pipes 71 which are mounted between surfaces which are defined by the respective yokes 61, 62, 63 and the cover 69 which face each other in such a manner as to extend along an interior of the cover 69 are provided, and the fluid cooled pipes 71 are such as to be formed into an integral unit by bending a pipe line reaching from a fluid supply port 71A to a fluid discharge port 71B in three dimensions.

Incidentally, in the related arts, since the cooler exists on the magnetic gap side, the magnetic gap needs to formed wider, and in order to secure the thrust, an increase in current or the number of turns results, posing a problem of heat loss.

In addition, since the pipes and the bobbin are interposed between the coil making up a heat generating portion and the cooling medium, sufficient cooling effect could not be obtained.

DISCLOSURE OF THE INVENTION

The invention is made with a view to solving these problems and an object thereof is to provide a voice coil type linear motor which reduces the heat loss, which can obtain sufficient cooling effect, which is free from reduction in thrust due to effective function of a magnetic field, which prevents an increase in external dimensions, and which is inexpensive.

With a view to solving the problems, according to a first aspect of the invention, there is provided a voice coil type linear motor with a cooling function including a closed magnetic circuit formed into the θ-shape, by an inner yoke provided between a pair of outer yokes made up of magnetic materials arranged in parallel with a longitudinal center axis in such a manner as to be in parallel with the pair of outer yokes, the outer yokes and side yokes provided at both end portions of the inner yoke; and permanent magnets provided on inner sides of the outer yokes and on outer sides of the inner yoke with polarities of the permanent magnets which face opposite surfaces of the outer yoke and the inner yoke being made opposite to each other or with polarities of the permanent magnets which face only the outer yokes being made opposite each other to thereby a field, wherein an armature made up of a bobbin of non-magnetic and insulating materials and a coil provided around the bobbin is provided between the permanent magnets via air gaps in such a manner as to move in an axial direction or in such a manner that, on the contrary, the armature is made stationary, whereas the permanent magnet sides move, the voice coil type linear motor with a cooling function being characterized in that the coil is wound around the bobbin, in that a case is constructed on an exterior of the bobbin, in that a coil portion is made watertight, and in that a fluid supply port and a fluid discharge port are provided on the bobbin or the case, whereby a cooling fluid is caused to flow between the coil and the case so that the coil is cooled directly.

In addition, according to a second aspect of the invention, there is provided a voice coil type linear motor with a cooling function as set forth in the first aspect of the invention, characterized in that an O-ring is mounted between the bobbin and the case so as to realize watertightness therebetween to thereby cool the coil directly.

In addition, according to a third aspect of the invention, there is provided a voice coil type linear motor with a cooling function as set forth in the first aspect of the invention, characterized in that watertighness is realized between the bobbin and the case by joining the bobbin and the case together through bonding or a combination of bonding and screw fastening to thereby cool the coil directly.

By the configurations, since the cooling fluid enters from the fluid supply port, flows over the surface of the coil and is discharged from the fluid discharge port so as to cool the coil during the flow, a voice coil type linear motor can be obtained which reduces heat loss, which can obtain sufficient cooling effect, which is free from reduction in thrust due to effective function of a magnetic field, which prevents an increase in external dimensions, and which is inexpensive.

As is described heretofore, since the armature coil is wound around the bobbin, the exterior of the bobbin is covered with the case so that the coil portion is made to be watertight, and the fluid supply port and the fluid discharge port are provided on the bobbin or the case, whereby the cooling fluid is caused to flow between the oil and the case so as to cool the coil directly, the following advantages can be provided:

(1) Since the cooling efficiency is high, a high-speed and high-response motor can be provided;
(2) Since heat is prevented from escaping to the periphery, no thermal influence is given to other machines mounted;
(3) Since the magnetic field functions effectively, there is no reduction in thrust;
(4) The external dimensions are hardly increased; and
(5) Production is effected inexpensively.

BEST MODE FOR CARRYING OUT THE INVENTION

The invention will be described in detail based on the drawings.

Figure 1:
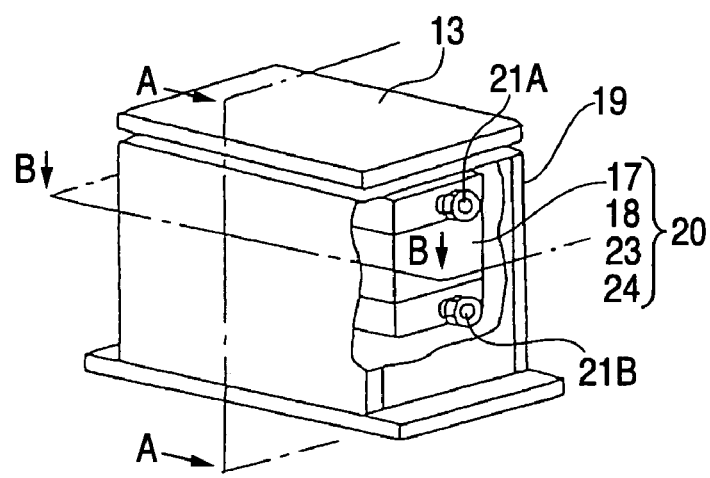
FIG. 1 is a partially cut-away perspective view showing the entirety of a first embodiment of the invention.
Figure 2:
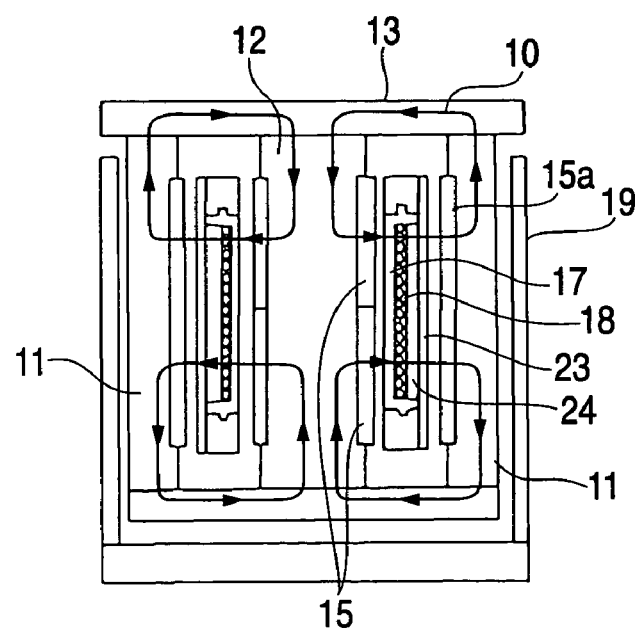
FIG. 2 is a cross-sectional view taken along the line A-A in FIG. 1.
Figure 3:
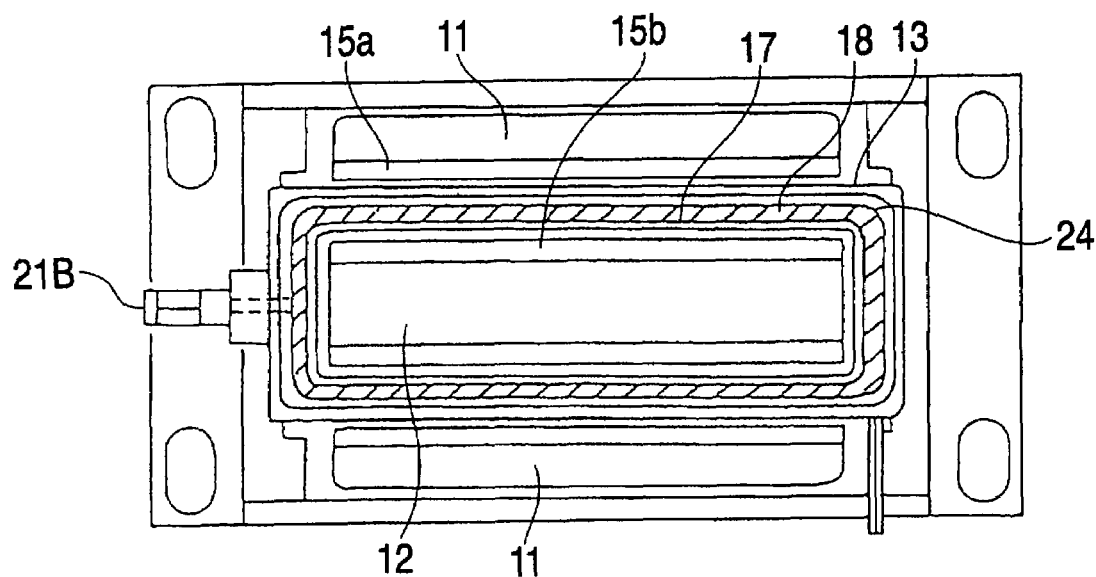
FIG. 3 is a sectional view taken along the line B-B in FIG. 1.
Figure 4:
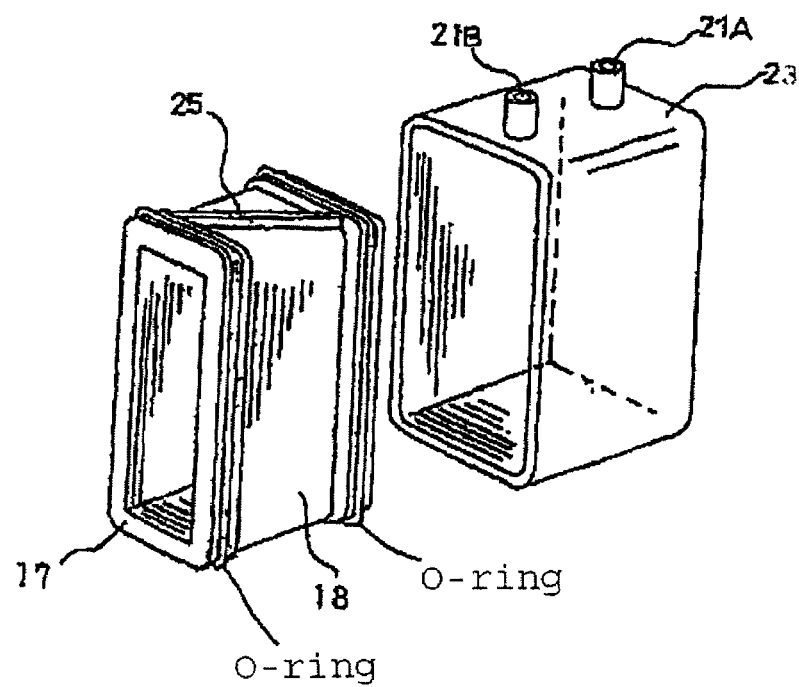
FIG. 4 is an exploded perspective view of a constituent part made up of a bobbin, a coil and a case which is a constituent part which constitute a core of FIG. 1.
Figure 5:
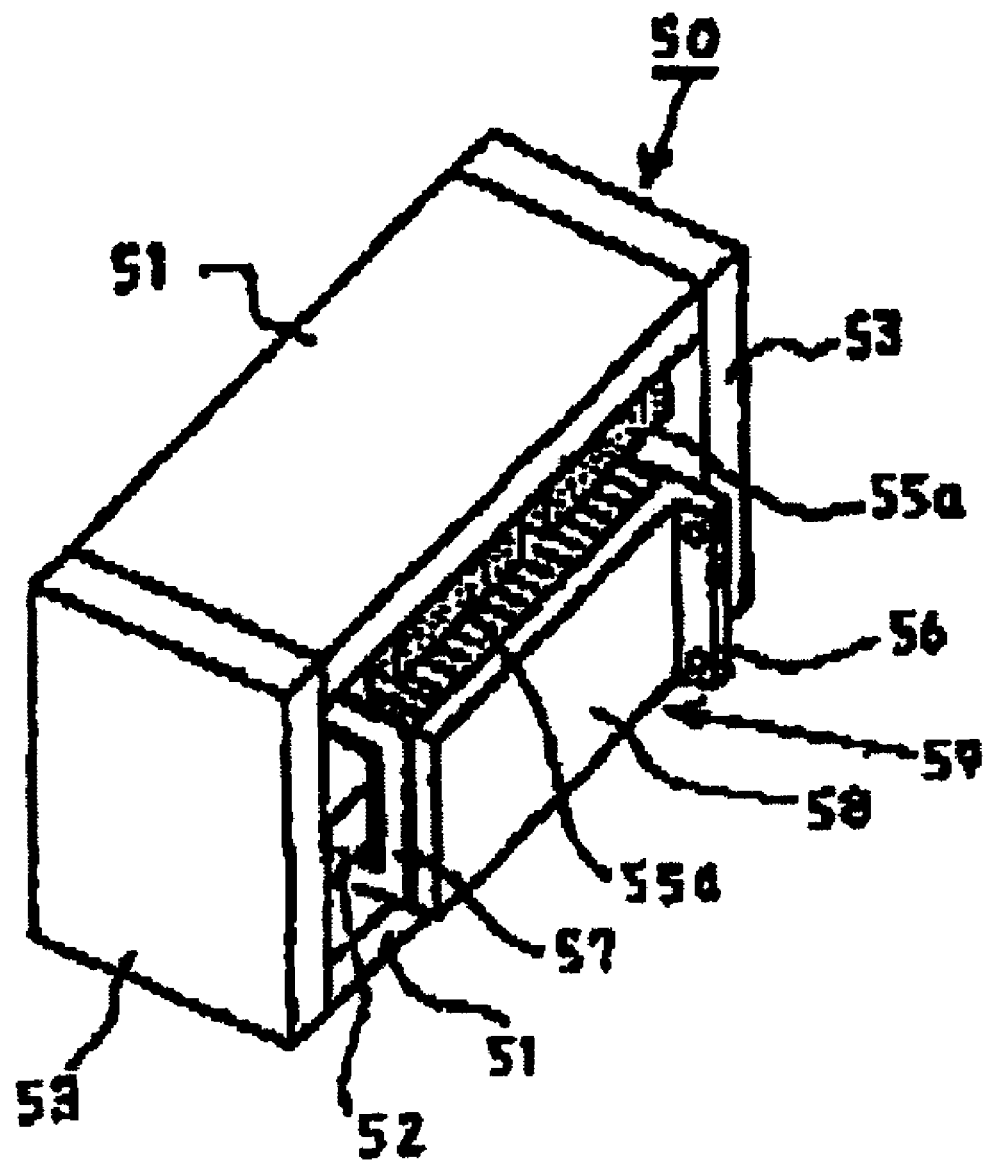
FIG. 5 shows a voice coil type linear motor having a conventionally known cooling construction.
Figure 6A:
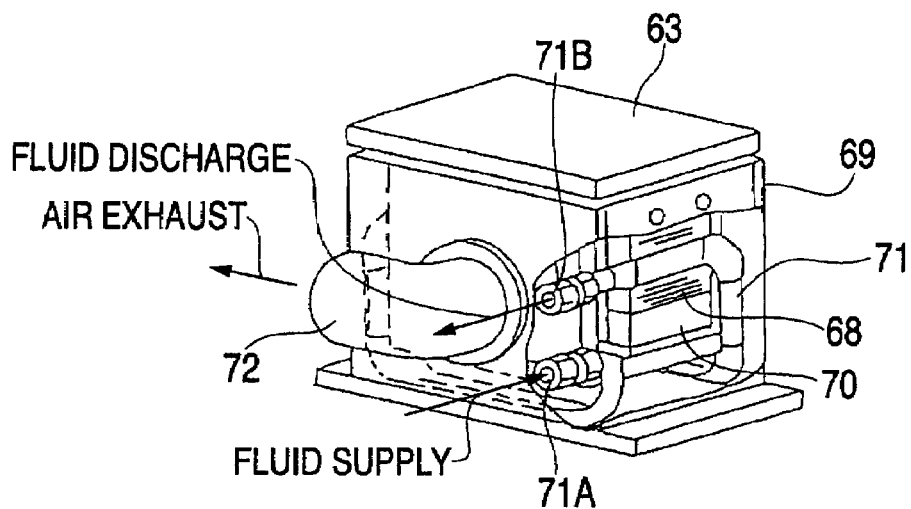
FIG. 6 shows a voice coil type linear motor having another conventionally known cooling construction.
Figure 6B:
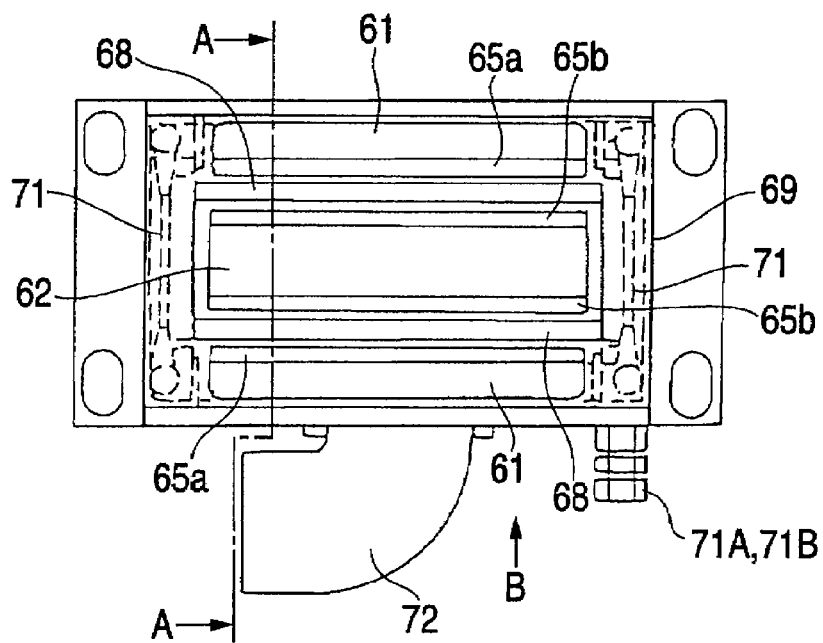

FIGS. 1 to 4 shown an embodiment of the invention, wherein FIG. 1 is a partially cut-away perspective view showing the entirety of a voice coil type linear motor, FIG. 2 is a cross-sectional view taken along the line A-A in FIG. 1, and FIG. 3 is a sectional view taken along the line B-B in FIG. 1. FIG. 4 is an exploded perspective view of a constituent part made up of a bobbin, a coil and a case.

In FIGS. 1 to 3, 10 denotes a filed, 11 denotes a pair of outer yokes formed of a flat plate-like ferromagnetic material, 12 denotes an inner yoke, 13 denotes a pair of side yokes of a flat plate-like ferromagnetic material, 15 denotes a permanent magnet, 17 denotes a bobbin, 18 denotes an armature coil wound around the bobbin 17, 19 denotes a cover, 23 denotes an outer case of the armature coil, 21A denotes a fluid supply port, 21B denotes a fluid discharge port, and 24 denotes a fluid line 24. 20 is made up of the bobbin 17, the coil 18, the case 23 and the fluid line 24.

In the voice coil type linear motor, a pair of outer yokes 11, 11 of a flat plate-like ferromagnetic material are provided in parallel with a longitudinal center axis, and permanent magnets 15a, 15a are disposed inside thereof. A pair of side yokes 13, 13 of a flat plate-like ferromagnetic material are fixed to both sides of the outer yokes 11, 11 in such a manner as to face each other. An inner yoke 12 is fixed to central portions of the side yokes 13, 13. In addition, permanent magnets 15b, 15b, which are magnetized to have a different polarity relative to the permanent magnets 15a, 15a, are disposed on upper and lower surfaces of the inner yoke 12 in such a manner that 15a and 15b face each other. Namely, the outer yokes 11, 11, the side yokes 13, 13, and the inner yoke 12 forms the θ-shape, and the permanent magnets 15a, 15b are disposed inside the shape so formed, whereby a field 10 is formed.

The armature coil 18 wound around the bobbin 17 and an exterior case 23 which covers end portions of the armature coil 18 make up an armature, and the permanent magnets 15a and 15b are disposed with an air gap being provided therebetween, whereby the armature becomes a moving element which freely moves in the axial direction.

FIG. 4 is an exploded perspective view of a constituent part made up of the bobbin, the coil and the case, which makes up a core constituent part of FIG. 1.

A cooling fluid which has entered from the fluid supply port 21A passes through an air gap between the armature coil 18 and the exterior case 23 thereof and is then discharged from the fluid discharge port 21B. During the flow, the cooling fluid takes up heat from the armature coil 18 by flowing directly over the surface of the armature coil 18 to thereby cool the armature coil 18.

In addition, the bobbin 17 and the exterior case 23 are made of non-magnetic and high electrically resistant materials and do not affect magnetism generated in the armature coil 18. In addition, the cooling fluid is such as to have insulating properties and causes no short circuit of electricity applied to the armature coil 18. Furthermore, an O ring may be mounted between the bobbin 17 and the exterior case 23 to produce watertightness therebetween. Alternatively, the bobbin 17 and the exterior case 23 may be secure joined together through bonding or a combination of bonding and screwing to produce watertightness therebetween.

INDUSTRIAL APPLICABILITY

The invention can be applied, in particular, to a field where by being applied to a cooling construction for a voice coil type linear motor which is required to realize high thrust and high efficiency and to generate less heat, a voice coil type linear motor is produced and provided which reduces the heat loss, which can obtain sufficient cooling effect, which is free from reduction in thrust due to effective function of a magnetic field, which is small in size, and which is inexpensive.

The invention claimed is:

1. A voice coil type linear motor with a cooling function comprising:

a closed magnetic circuit formed into the θ-shape, by an inner yoke provided between a pair of outer yokes made up of magnetic materials arranged in parallel with a longitudinal center axis in such a manner as to be in parallel with the pair of outer yokes, the outer yokes and side yokes provided at both end portions of the inner yoke; and permanent magnets provided on inner sides of the outer yokes and on outer sides of the inner yoke with polarities thereof which face opposite surfaces of the outer yoke and the inner yoke being made opposite to each other or with polarities thereof which face only the outer yokes being made opposite each other to thereby a field, wherein an armature made up of a bobbin of non-magnetic and insulating materials and a coil provided around the bobbin is provided between the permanent magnets via air gaps in such a manner as to move in an axial direction or in such a manner that, on the contrary, the armature is made stationary, and the permanent magnet sides move, the coil is wound around the bobbin, a case is constructed on an exterior of the bobbin, a coil portion is made watertight, a fluid supply port and a fluid discharge port are provided on the bobbin or the case, and a cooling fluid is caused to flow between the coil and the case so that the coil is cooled directly wherein a cooling path is divided into a fluid supply side and a fluid discharge side by dividing a gap between the bobbin and the case, and the fluid supply port and the fluid discharge port are provided on the same surface of the case.

2. The voice coil type linear motor with a cooling function as set forth in claim 1, further comprising:

an O-ring mounted between the bobbin and the case so as to realize watertightness there between to thereby cool the coil directly.

3. The voice coil type linear motor with a cooling function as set forth in claim 1,wherein watertightness is realized between the bobbin and the case by joining the bobbin and the case together through bonding or a combination of bonding and screw fastening to thereby cool the coil directly.

* * * * *